United States Patent [19]
Yano

[11] Patent Number: 5,473,925
[45] Date of Patent: Dec. 12, 1995

[54] APPARATUS FOR CONTINUOUSLY FORCING AN ELONGATE AND EXTRUSILE RAW MATERIAL INTO AN EXTRUSION PRESSURE VESSEL

[75] Inventor: Sadahide Yano, Osakashi, Japan

[73] Assignee: Yugen Kaisha Yano Engineering, Osaka, Japan

[21] Appl. No.: 188,585

[22] Filed: Jan. 28, 1994

[30] Foreign Application Priority Data

Jan. 29, 1993 [JP] Japan .................................. 5-013318

[51] Int. Cl.⁶ .......................... B21C 33/00; B21C 31/00; B21C 23/00
[52] U.S. Cl. .................. 72/262; 72/270; 72/271
[58] Field of Search ................ 226/168; 72/77, 72/262, 270, 271, 272, 259

[56] References Cited

U.S. PATENT DOCUMENTS 5,167,138 12/1992 Sinha et al. .............................. 72/262

FOREIGN PATENT DOCUMENTS

149170 3/1904 Germany .

*Primary Examiner*—Lowell A. Larson
*Assistant Examiner*—Rodney A. Butler
*Attorney, Agent, or Firm*—Collard & Roe

[57] ABSTRACT

An apparatus has first propellers (20) and second propellers (21) alternating with the first propellers. Each propeller has one or more helical biting edges (24a) protruding into a guide passage (28) through which a raw material (W) advances. The biting edges are formed along an inner periphery of each propeller at a predetermined lead angle so as to bite an outer periphery of the raw material (W). The apparatus further has a drive mechanism for rotating the first propellers (20) in a direction opposite to that in which the second propellers (21) are driven. The helical biting edges (24a) are inclined such that the raw material (W) may be forced towards a pressure vessel (2) by all the propellers, notwithstanding the opposite directions in which the first and second propellers ape driven, so that a strong thrust is applied to the raw material, without causing any torsion of the material which is being forced towards the pressure vessel.

6 Claims, 5 Drawing Sheets

APPARATUS FOR CONTINUOUSLY FORCING AN ELONGATE AND EXTRUSILE RAW MATERIAL INTO AN EXTRUSION PRESSURE VESSEL

BACKGROUND OF THE INVENTION AND RELATED ART STATEMENT

1. Field of the Invention

The present invention relates to an apparatus for continuously forcing an elongate raw material into an extrusion pressure vessel, wherein the raw material is a wire or rod of a metal such as aluminum which has to be extruded from the vessel in a continuous manner.

2. Related Art

For example in the case of extruding an aluminum material, it has been a common practice to repeat batch-wise steps, and in each step an aluminum billet is loaded in a container as the pressure vessel so as to be pressed through a die by a stem or ram which in turn is driven forward.

However in such a batch-wise system, the repeated loading of the billets has been lowering the productivity of this process, and in some of the thus extruded products a discontinuity has occurred due to the transfer from the preceding billet to the succeeding one. The discontinuity has not only impaired the quality, but also caused a lower yield of said products in a case wherein the discontinuous portions were eliminated.

The present inventor has therefore proposed a continuous extrusion system in which an elongate and extrusile aluminum raw material such as a wire or rod is continuously fed to a pressure vessel. The raw material is compressed in the vessel so as to be extruded through a die. Such a hew system will be exemplified below in the preferred embodiments of the present invention.

In the continuous extrusion system which was proposed by me, the extrusion pressure of the raw material is raised by the forcing thereof into the pressure vessel. Depending on the desired cross-sectional shape, the extrusion ratio, the nature and/or temperature of said raw material, it has been possible that an extraordinarily high pressure must be imparted to the material which is being loaded. For example, it has sometimes been difficult for a pair of simple drive rollers to grip and forcibly push the material into the pressure vessel.

OBJECT OF THE INVENTION

An object of the present invention made in view of the drawbacks inherent in the prior art methods is therefore to provide a novel apparatus constructed such that an elongate and extrusile raw material can continuously be fed into a pressure vessel more forcibly than in the prior art apparatuses.

Other objects and advantages of the invention will become apparent from its preferred embodiments, which will be given below not for any limitative but merely for exemplary purpose so that any modification could be made within the scope and spirit of the present invention.

SUMMARY OF THE INVENTION

An apparatus for continuously forcing a wire-shaped or rod-shaped elongate raw material into an extrusion pressure vessel in an extruder is provided herein to achieve the objects, wherein the apparatus comprises: at least one first propellers and at least one second propellers; a guide passage through which the raw material advances, the guide passage having an axis and penetrating all the propellers; one or more helical biting edges which protrude into the guide passage and are formed along an inner periphery of each propeller at a predetermined lead angle so as to bite an outer periphery of the raw material; all the propellers being arranged in series at different positions along the axis, rotatable around the axis but undisplaceable relative to each other axially of the guide passage; and a drive mechanism for rotating the first and second propellers in opposite directions, wherein the helical biting edges are inclined such that the raw material is forced towards the pressure vessel by the propellers, notwithstanding the opposite directions in which the first and second propellers rotate.

The smaller is the lead angle of the helical biting edges, the stronger is the driving power of the propellers thrusting the raw material into the pressure vessel. It is however noted that the rotational speed of those propellers must be raised to meet a required feed speed of said Paw material. Thus, the driving power should be set up and/or modified to be in a desirable relationship to the rotational speed, taking into account all the pertinent conditions, factors and requirements.

The number of the first propellers as well as the number of the second ones depend on how strong the raw material has to be thrust. These numbers may be the same as each other and 1, 2 or more, or alternatively may be different.

In operation of the apparatus provided herein to continuously feed the raw material, the helical biting edges of the first and second propellers driven by the drive mechanism will bite the outer periphery of the extrusile raw material. There will appear a kind of screw driving system between the helical edges and the elongate raw material, whereby an extremely strong thrust is applied thereto towards the pressure vessel.

Further, since the first propellers rotate in a direction opposite to that in which the second ones so do, any disadvantage that the extrusile raw material will unintentionally rotate itself while advancing towards said vessel is avoided or diminished.

It is preferable that if the extrusile raw material is an aluminum alloy, the helical biting edges are made of a hard material such as a hard metal ( i.e., cemented carbide ), a ceramics or the like.

It is also preferable that the helical biting edge in each propeller is not accompanied by any valleys or grooves disposed on its both sides.

Further, each rotating helical edge may preferably be shaped such that its middle portion protrudes relatively deeper into the guide passage than its end portions respectively facing an entrance and an exit of the guide passage.

In a preferable embodiment, the drive mechanism is constructed such that its input gear units are in mesh with one another, and one of them being in mesh with a common pinion. As a prime mover drives the pinion to rotate, the latter will drive the input gear units so as to rotate the first and second propellers in unison but in opposite directions.

In this arrangement of the drive mechanism, two or more first propellers are preferably combined with two or more second propellers so that each of the former is interposed between two of the latter and vice versa, in axial alignment. Gear teeth may be formed around and integral with the outer periphery of each propeller. First pinions firmly secured on a first shaft may be in mesh with the respective first propellers, whilst second pinions secured on a second shaft are in mesh with the second propellers.

Thus, with one of the input gear units being driven, it will not only drive by the first shaft the first propellers but also drive the other input gear unit which in turn will similarly drive the second propellers.

DETAILED DESCRIPTION OF THE PREFERRED EMBODIMENTS

Now some embodiments of the present invention will be described in detail.

An extruder in which an apparatus for forcing a raw material is installed will be outlined at first, with the description of the apparatus being given later. The extruder may not be restricted in the invention to one which is exemplified below.

Figure 1:
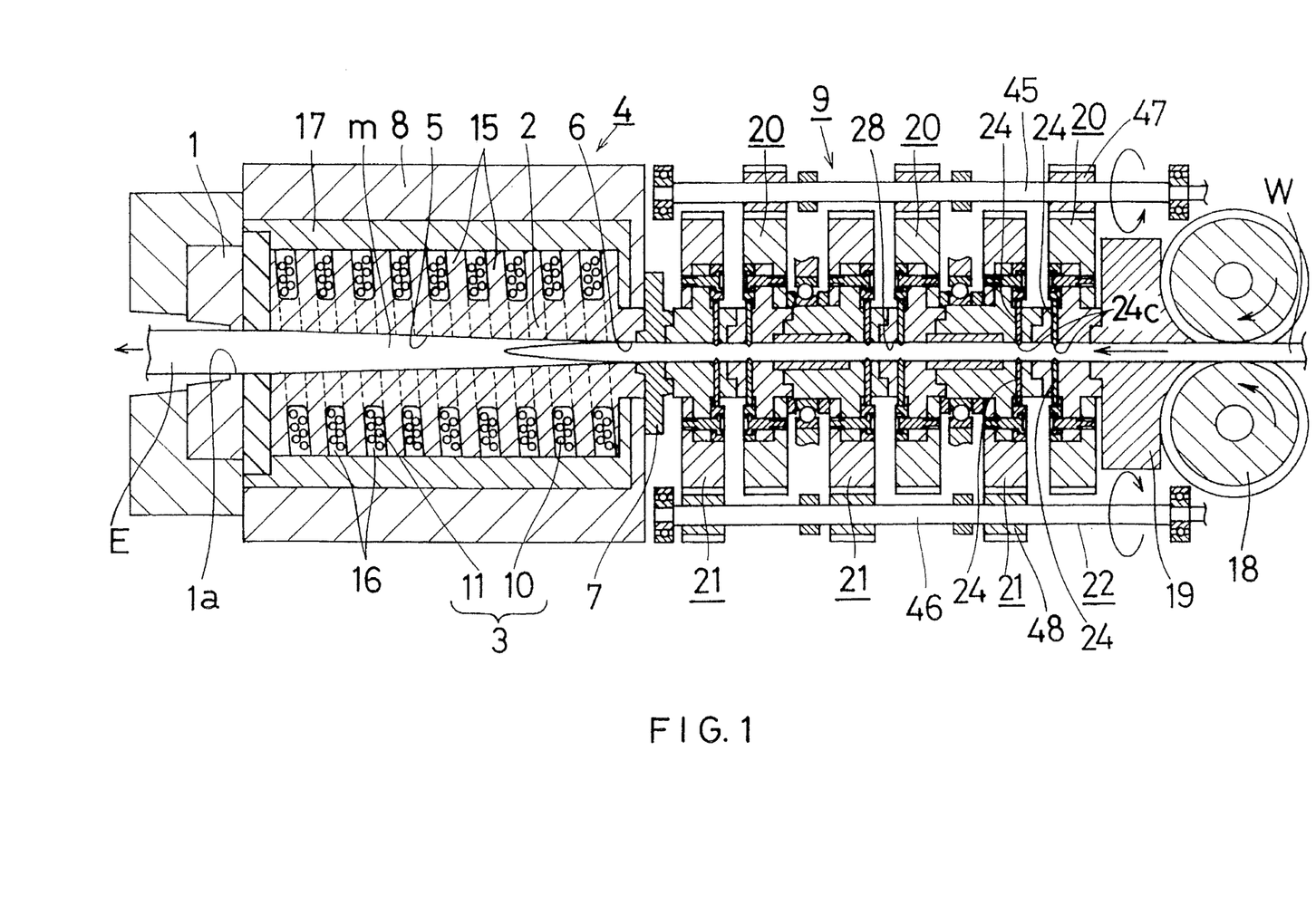
FIG. 1 is a cross section of an extruder which is provide with an apparatus for supplying thereto a raw material, with the apparatus constructed in an embodiment of the present invention.

The extruder 4 shown in FIG. 1 comprises a die 1, a pressure vessel 2 and a heater 3.

The pressure vessel 2 is made of a material resistant to pressure and heat. Such a material includes a heat resisting steel, ceramics and the like.

A compressing chamber 5 formed in the pressure vessel 2 is tapered and gradually expanded towards an exit through which the .raw material advances to be extruded. An entrance of the chamber 5 is an aperture 6 which fits on a raw material 'W' rod-shaped or wire-shaped and advancing into said chamber. Due to the tapered shape of the compressing chamber 5, the cross-sectional area of its entrance aperture 6 is smaller than that of its inner region.

A nozzle 7 made of a hard material such as a hard metal, ceramics or the like is fixed to the aperture 6 so that the raw material 'W' can be guided smoothly into the chamber 5.

A helical rib 15 of the shape of a square thread protrudes from the outer periphery of the pressure vessel 2, at a desired lead angle. This helical rib integral with said periphery raises the pressure resistance of the vessel 2, particularly in its radial direction. A helical groove composed of consecutive annular sections each defined between the adjacent annular ridges of the rib 15 is used as a spiral space 16 for accommodation of a heater. Basal portions or feet of the helical rib 15 may desirably be chamfered round as shown in FIG. 1, for a stronger junction to the body of the vessel.

The heater 3 is capable of heating an extrusile block 'm' in the compressing chamber 5 to a temperature such that the block may be rendered less resistant to deformation during the extrusion process.

The heater 3 is coiled around the pressure vessel 2 and extends helically through the spiral space 16 so as to surround the compressing chamber 5. Such an arrangement of the heater 3, which will make easier the construction thereof and a wiring operation therefor, is advantageous over a hypothetical case wherein a number of discrete annular recesses accommodate discrete heating elements.

A first and second heater elements 10 and 11 constitute the heater 3, wherein the first one 10 extends along the pressure vessel and around an upstream region thereof near the entrance for the raw material 'W' for the high-frequency induction heating thereof. The second heater element 11 extends around a downstream region of the vessel and near the exit for the extrusile block 'm' for the middle- or low-frequency induction heating thereof.

The first heater element 10 will heat the extrusile block 'm' sideways from its outer periphery so that a friction between it and the inner periphery of the compressing chamber 5 is lowered to easily receive the raw material 'W'. On the other hand, the second heater element 11 will evenly heat the block 'm' to a temperature at which its resistance to deformation is weakened for smooth extrusion. The heater 3 referred to above may be composed of a single heating element or otherwise composed.

A heat-insulating layer 17 surrounding the pressure vessel 2 is held in a housing 8.

The extruder of the described structure will operate as follows.

The elongate raw material 'W' rod-shaped or wire-shaped may be an aluminum alloy such as those included in the A1000, A2000, A3000, A5000 or A6000 series. This material 'W' may not be the aluminum alloy but be any metallic material which is extrusile.

The raw material 'W' may be of such a cross-sectional size that it can continuously be fed to the extruder which is running continuously. The size may preferably be such that the material 'W' can be stored in an arcuate and compacted state and be urged accurately into the compressing chamber 5 in order to serve as a continuously operating plunger. Although the material 'W' need not be round in cross section but may be of any other shape, a preferable example thereof is an aluminum round rod having a diameter of about 10 mm.

The extrusile block 'm' made of the same substance as the raw material 'W' will be filled at first in the compressing chamber 5 of the pressure vessel 2, before starting the extrusion process. Both the heating elements 10 and 11 will then be activated to heat the block 'm' in the chamber 5 so that its deformation resistance is reduced to be ready for extrusion. Subsequently, the elongate raw material 'W' still solid at or above room temperature will be pressed into compressing chamber 5, through the nozzle 7 and the entrance 6 of the vessel 2. An apparatus 9 used to feed the material in this manner will be described below.

The raw material 'W' having entered the chamber 5 through entrance 6 will smoothly advance a certain distance therein while being heated by the first heater element 10. A core portion of the material in this upstream region of the chamber remains solid, but a skin portion will be heated and softened. As the material 'W' further advances over the said distance into a downstream region of said chamber, the second heater element 11 will further heat the material 'W' and render it less resistant to deformation, until it seems as if molten into and becomes integral with the extrusile block 'm' held in the chamber 5.

Such a forcible and continuous feeding of the rod-shaped or wire-shaped raw material 'W' will compress the extrusile block m to be extruded through an opening 1a of the die 1, thereby forming an extruded product 'E' of a given cross-sectional shape. As will now be apparent, the elongate raw material 'W' acts as if it were a plunger continuously driven within the compressing chamber 5, realizing a non-batch-wise continuous extrusion.

Temperature of the extrusile block 'm' heated in the chamber 5 by the heater 3 does depend on the substance of which the block is made. In a case wherein the block 'm' is made of an aluminum alloy, it will be kept at, slightly above or below room temperature so that the portion of raw material 'W' remains solid near the entrance 6 while being thrust into the chamber. In the downstream region adjacent to the exit of the chamber 5, the block 'm' will preferably be heated for example to a temperature of about 400–850° C., which enables smooth extrusion through opening la of the die 1. A middle region between the entrance and the exit of the chamber 5 will be maintained for example at a temperature of about 400–600° C., whereby the material 'W' smoothly becomes integral with the material 'm'.

The apparatus 9 forcing the raw material into and combined with the extruder 4 as summarized above will now be described in detail.

Figure 2:
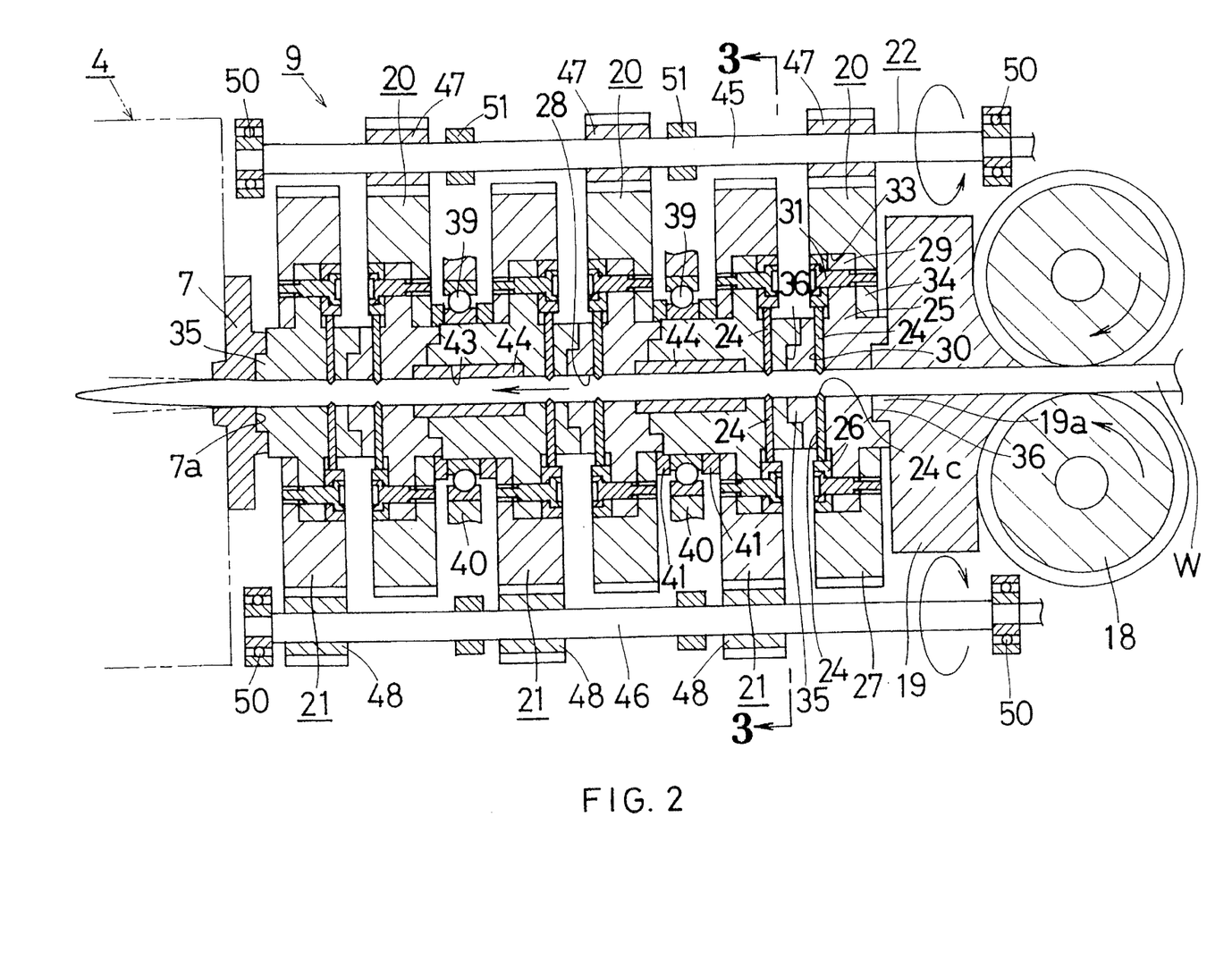
FIG. 2 is an enlarged cross section of the apparatus shown in FIG. 1.

The apparatus 9 is disposed in rear of and in close contact with the pressure vessel 2 as shown in FIG. 2, and comprises three first propellers 20, three second propellers 21 and a drive mechanism 22 designed to rotate these propellers. The reference numeral 18 denotes a pair of guide rollers, with the further numeral 19 denoting a stationary guide made of a hard material such as hard metal or ceramics.

Those first and second propellers 20 and 21 are slightly different from one another, but are almost of the same structure. Therefore, only the first propellers 20 will be described here.

Figure 3A:
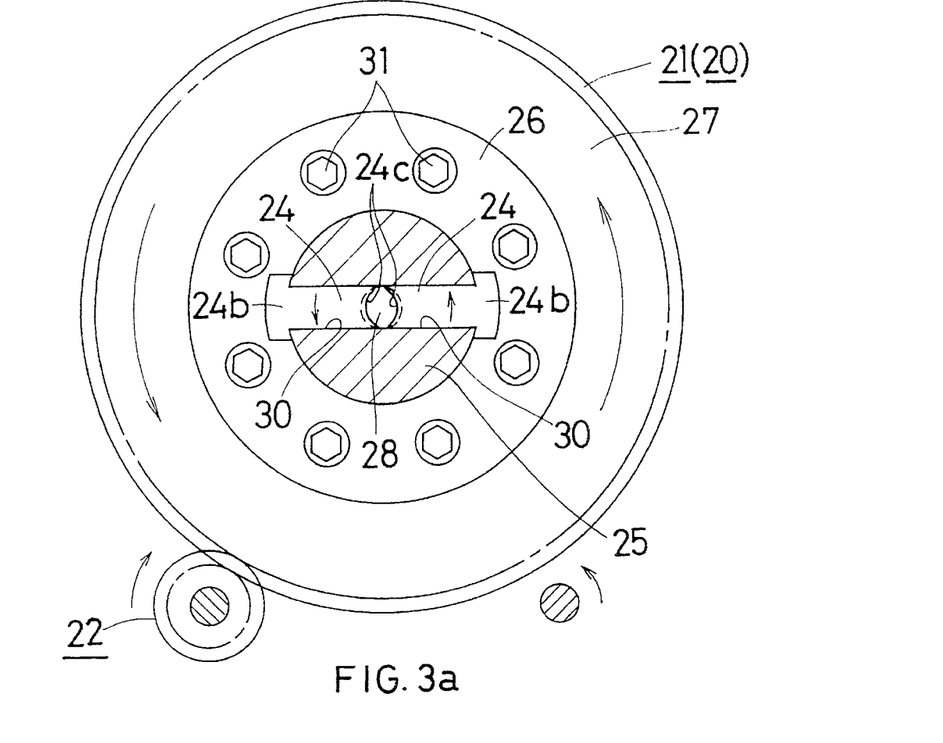
FIG. 3a is a cross section taken along the line 3—3 in FIG. 2.

As is shown in FIGS. 2 and 3a, each first propeller 20 comprises a pair of blades 24, a holder 25 for carrying the blades 24, an annular plate 26 for securing the blades in place, and a gear 27 secured to a periphery of the holder 25. These members 24 to 27 are fixedly combined with each other to form an assembly. This assembly can be dismantled to inexpensively replace the blades with new ones, when worn out or necessary to match a change in the kind of the raw material 'W'.

A body 24a of each blade 24 is a strip whose basal end 24b is expanded sideways. Formed at a semicircular and convex inner end opposite to the basal end is a helical biting edge 24c. The blades 24 are made of a hard material such as a hard metal, ceramics or the like of a comparative hardness.

Figure 3B:
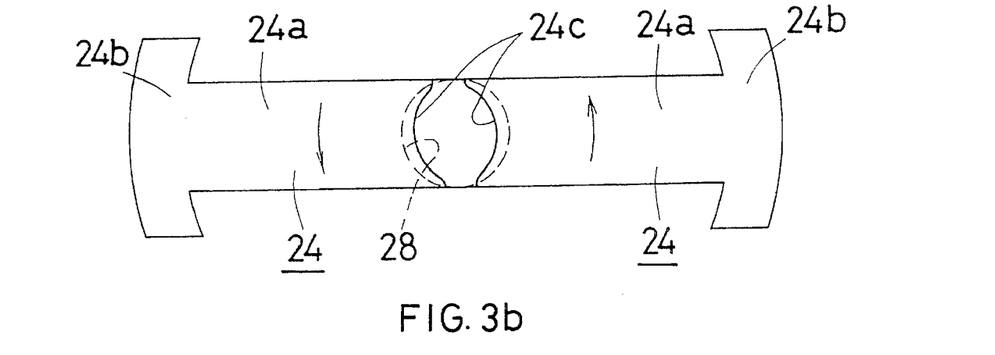
FIG. 3b is a plan view of blades installed in the apparatus.
Figure 3C:
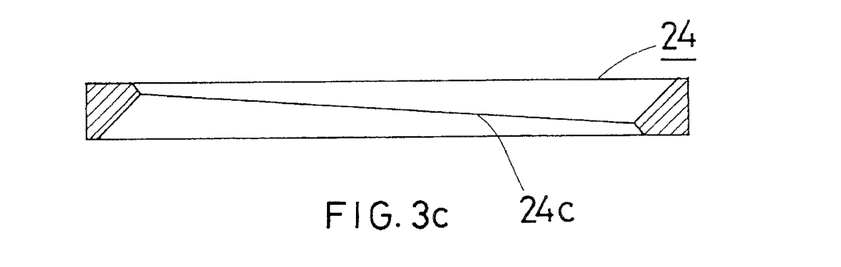
FIG. 3c is a front elevation of a helical biting edge shown partly in cross section and formed as an inner integral part of each blade.

As FIG. 3c shows, the biting edge 24c is a summit of a helically extending simple ridge when seen in cross section, and is not accompanied by any valley on either side. Deficiency of valleys is effective to protect the raw material 'W' from being jammed in part to lower the thrust applied thereto.

If there is no serious problem of jamming, then two or more parallel edges ridge-shaped in cross section and accompanied by valleys therebetween may be formed at the end of each blade. Those valleys may however be rounded at their bottoms in order to diminish the possibility of jamming.

The helical edges 24c protrude into a guide passage 28 through which the raw material advances. It is preferable that when seen in rotational direction illustrated in FIG. 3b each edge has an intermediate portion protruding deeper into the guide passage, than its leading and trailing end portions. Due to this configuration of the edges 24c, they can smoothly come into a biting engagement with the outer periphery of the raw material, and surely drive it forward before smoothly disengaging therefrom. Thus, the raw material will be transported in a smooth and reliable manner.

The guide passage 28 for the raw material is formed through and axially of the holder 25, as shown in FIGS. 2 and 3a. An annular flange 29, which is integral with the holder so as to secure thereto members mentioned below, protrudes radially and outwardly from a middle portion and in a direction of thickness of the holder 25. The holder 25 is preferably made of a hard material such as a hard metal, ceramics or the like so that the raw material 'W' can be in a smooth sliding contact with it and the durability of a bearing portion of the die 1 is ensured.

Slots 30 are perforated through a portion of the holder 25 and adjacent to the flange 29. The slots 30 extend radially and are arranged at angular intervals of 180° and communicate with the guide passage 28 so that the blades 24 tightly fit in the slots.

The blades 24 are thus inserted radially and inwardly into the respective slots 30, wherein their expanded ends 24b bear against the outer peripheral surface of the holder 25, with their helical edges 24c protruding a given distance into the guide passage 28, as shown in FIG. 3a.

The inner peripheral surface of annular plate 26, which is bolted 31 to the flange 29 of holder 25, supports the outer surfaces of the expanded end 24b of each blade 24. The blades kept in place in this manner are undisplaceable in radial direction.

The gear 27 has an axial bore 33 to receive the holder 25, and an annular flange 34 protruding inwardly into the bore. The flange 29 of the holder is laid on the annular flange 34 of the gear, and fastened thereto by means of the bolt 31, thereby firmly attaching the gear 27 to the holder 25.

A short columnar lug 35 is formed to protrude centrally from one side of the holder 25, and a shallow cylindrical recess 36 is similarly and correspondingly formed on the other side of said holder. These lug 35 and recess 36 can be brought into a rotating engagement.

By engaging the lugs 35 with the corresponding recesses 36, the first propellers 20 are combined in series and coaxially with the second propellers 21. Thus, the first and second propellers alternate with one another so that they can rotate independently of each other.

The lug 35 of the propeller 21 located most downstream of the flow of the raw material is fitted in the shallow recess 7a of the nozzle 7 attached to the pressure vessel 2. On the other hand, the recess 36 of the propeller 20 located most upstream of the flow fits on a short columnar lug 19a of the stationary guide 19, thus holding in place all the propellers 20 and 21 between the guide 19 and the nozzle 7.

Some of the first or second propellers 20 or 21 are elongate axially so that they are supported at their middle portions on a frame 40 by respective bearings 39. The reference numeral 41 denotes collars positioning the bearings.

Cylindrical recesses 43, each formed on the inner peripheral surfaces of the connected first and second propellers 20 and 21, extend axially a considerable distance between the adjacent blade groups 24 disposed upstream and downstream of the material flow. Collars 44, which are fitted in the cylindrical recesses 43 and define some zones of the guide passage 28, are made of a less frictional substance so as to afford a smooth flow of the raw material.

It is preferable that the guide passages 28 penetrating the connected first and second propellers 20 and 21 to form as a whole an integral passage whose inner wall is tapered for example at 1°–2° to be slightly flared towards its exit. Such a design will be advantageous in reducing the friction between the passage wall and the raw material 'W' and thereby ensuring a smooth transportation thereof.

The helical biting edges 24c of the blades 24 located downstream of the material flow through the guide passage 28 may protrude deeper thereinto than those located upstream of said flow. This design will prevent the edges from insufficiently biting the material due to any change in the state of its surface, which may possibly be softened due to friction or the like as it advances forward.

The drive mechanism 22 comprises a pair of first and second shafts 45 and 46. These shafts, which are parallel with one another, extend along the series of first and second propellers 20 and 21 and in parallel with the advancing raw material. Each of the shafts 45 and 46 is supported on the frame 40 by ball bearings 50 and plain bearings 51.

First pinions 47 are fixed to the periphery of the first shaft 45, at positions thereof corresponding to the first propellers 20. The first propellers 20 in mesh with the first pinions 47 will be driven to rotate in harmony and in the same direction. Similarly, second pinions 48 are fixed to the periphery of the second shaft 46, at positions thereof corresponding to the second propellers 21. Thus, second propellers 21 in mesh with the second pinions 48 will also be driven to rotate in harmony and in the same direction.

Figure 4A:
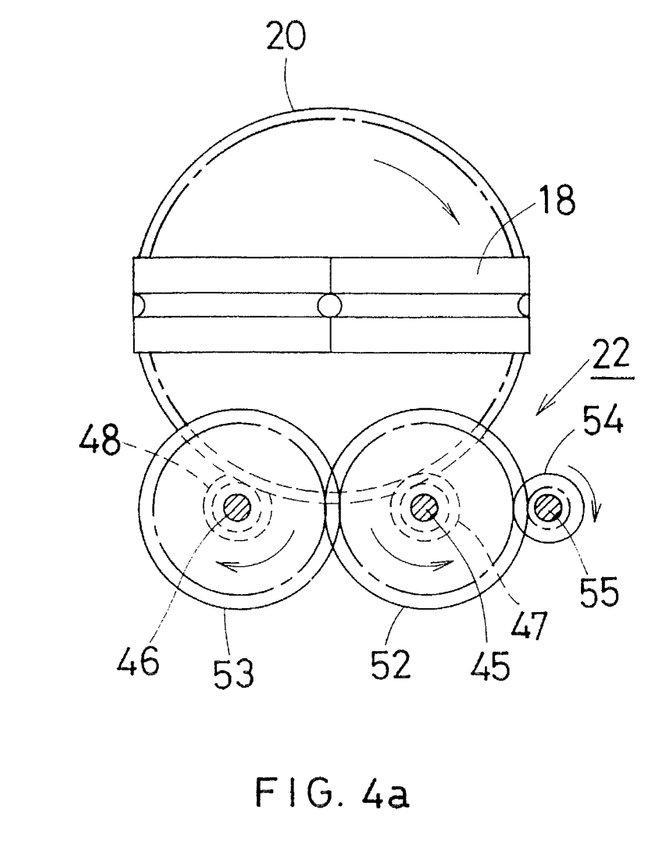
FIG. 4a is a front elevation of a transmission for drive means employed in the apparatus and shown partly in cross section.
Figure 4B:
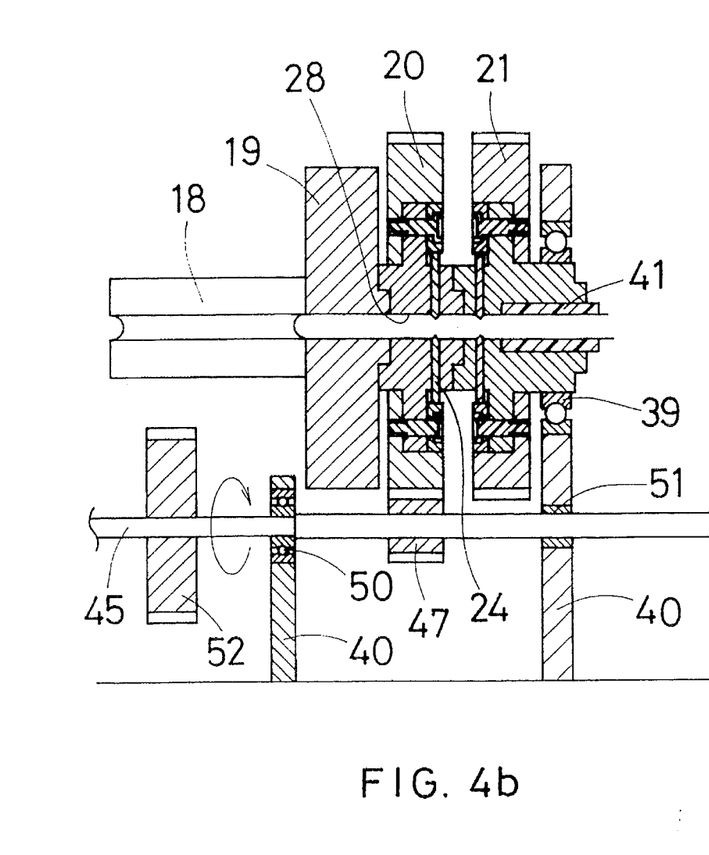
FIG. 4b is a side elevation of the transmission shown partly in cross section.

As FIGS. 4a and 4b show, input gear units 52 and 53 are fixed to ends of the first and second shafts 45 and 46, respectively. These input gear units 52 and 53 are in mesh with one another, and a common pinion 54 engages with one of the gear units 58. The common pinion 54 is fixedly carried by a drive shaft 55, which in turn is operatively connected to an output shaft 55 of a prime mover such as a not shown electric motor or an engine.

In operation of this drive mechanism 22, the prime mover will be switched on to rotate the common pinion 54 and thus drive the input gear units 52 and 53 to rotate at the same speed but in opposite directions. Consequently, the first and second shafts 45 and 46 rotate at the same speed in the opposite directions to transmit the power to the first and second propellers 20 and 21, through the first and second pinions 47 and 48, respectively. As a result, all the first propellers 20 will rotate at the same speed but in a direction opposite to that in which the all the second propellers 21 rotate at the same speed.

As is the case in this embodiment, a plurality of the first propellers may preferably be rotate in a direction opposite to that in which another plurality of the second ones so do, in order to build an effective transmission.

Since the first propellers 20 and the second ones 21 rotate in the opposite directions to thrust the raw material 'W' towards the pressure vessel 2, the helical biting edges 24c in the first propellers are of an ordinary pitch and those in the second ones are of a reverse pitch, or vice versa.

In operation of the apparatus 9 for forcing the raw material into the pressure vessel, the pair of feed rollers 18 will be activated to guide the raw material 'W' into the passage 28 formed through the first and second propellers 20 and 21. The pair of helical edges 24c in each of the propellers 20 and 21 will thus bite the periphery of said material 'W' and cooperate to push it towards the pressure vessel 2.

A thrust which such a 'screw drive' mechanism will impart to the raw material 'W' is so strong that the internal pressure in the vessel 2 is readily raised to a sufficient level to enable the smooth extrusion of said material.

The friction between the raw material 'W' and the passage through the apparatus 9 will raise the temperature of the material to such an extent as not to melt it but to reduce the heat energy which the heater 3 has to generate.

It is to be noted that since the first and second propellers 20 and 21 alternate with one another and rotate in opposite directions, the helical edges 24c in the first propellers will bite the raw material 'W' in a direction opposite to the in which the edges 24c in the second ones bite it. Therefore, the raw material is protected from torsion and undesirable spinning about its own axis, which torsion or spinning would otherwise impair the smooth feed of said material into the pressure vessel 2. It is an important feature in the illustrated embodiment that the blades in one propeller 20 or 21 and those in the next propeller 21 or 20 are disposed as close to one another as possible, in order to completely prevent the undesirable torsion or spinning of the raw material 'W'.

Further, since the input gear units 52 and 53 mounted on the shafts 45 and 46 and of the same size and structure automatically drive the first and second propellers 20 and 21 in opposite directions but strictly at the same speed, there is no possibility that the raw material would be collapsed, kinked or otherwise damaged to render difficult the smooth feed thereof.

Although three first propellers 20 are combined with three second ones 21 in the embodiment, one of the former may be used with one of the latter, or alternatively much more first propellers may be employed together with much more second ones, depending on the required strength of thrust applied to the material.

Figure 5A:
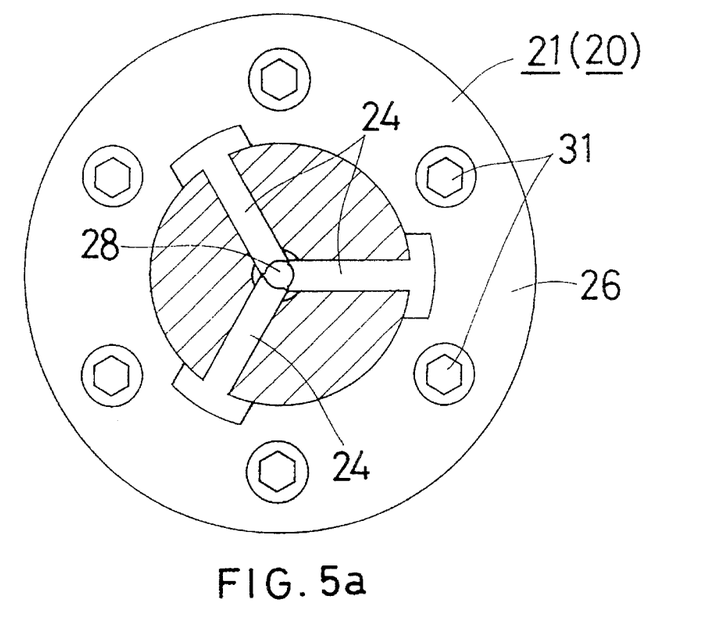
FIG. 5a is a plan view of a modified arrangement of the blades, shown partly in cross section.
Figure 5B:
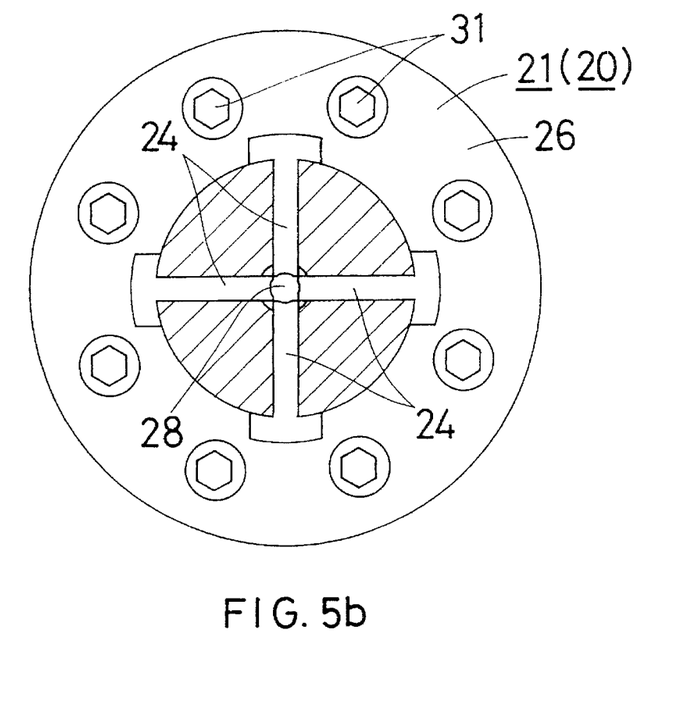
FIG. 5b is similarly a plan view of another modified arrangement of the blades, also shown partly in cross section.

In place of the two blades 24 in each propeller in the embodiment, three or four blades may be built in each propeller, as shown in FIGS. 5a and 5b.

In summary, the apparatus provided herein to continuously force an elongate raw material into the pressure vessel, which material has to be subsequently extruded therefrom, is constructed such that propellers each having a helical edge are rotated to cause their edges to bite the periphery of said material. Because a kind of 'screw drive' mechanism is effected when the propellers are driven, the material can forcibly and continuously be supplied surely to the vessel under a strong thrust. Thus, raw materials of any kind can now be extruded in a continuous manner, whereby feasibility of the continuous extrusion is remarkably improved.

As already detailed above, since the first and second propellers rotate in opposite directions, the raw material which is being fed to the extruder is well protected from unintentionally spining around its own axis or otherwise twisting, thereby affording a smoother feed of said material to the pressure vessel.

What is claimed is:

1. An apparatus for continuously forcing an elongate, rod-shaped, extrusile raw material into an extrusion pressure vessel of an extruder, the apparatus comprising:

a first propeller, a second propeller and a guide passage with an axis extending within said propellers through which the raw material advances, said propellers being serially arranged along the axis for rotation around the axis, said propellers being fixed in their axial positions;

each propeller having an inner periphery bordering the guide passage and a helical biting edge formed along said inner periphery and extending into the guide passage, said helical biting edge being formed at a predetermined lead angle to bite an outer periphery of the raw material;and a drive mechanism for rotating said first and second propellers in opposite directions from each other, said helical biting edges being inclined so that the raw material is forced toward the pressure vessel by said propellers notwithstanding the opposite directions of rotation of said propellers.

2. The apparatus according to claim 1, wherein the raw material is an aluminum alloy and said helical biting edges are made of a hard material selected from a group consisting of a hard metal, a ceramic and other materials having substantially the same hardness.

3. The apparatus according to claim 1, wherein each of said helical biting edges has two sides, said two sides are devoid of valleys and grooves.

4. The apparatus according to claim 1, wherein the guide passage has an entrance and an exit;

each helical biting edge has a middle portion and two end portions, said two end portions face the entrance and the exit, respectively; and said middle portion extends deeper into the guide passage than said end portions.

5. The apparatus according to claim 1, wherein said drive mechanism comprises:

a prime mover;

a pinion gear rotatably driven by said prime mover;

a first input gear rotatably driven by said pinion gear for rotating one of said propellers;

a second input gear rotatably driven by said first input gear for rotating the other of said propellers in the opposite direction of the one propeller.

6. The apparatus according to claim 5, comprising:

an additional first propeller and an additional second propeller, said first propellers are alternately arranged in axial alignment with said second propellers, each of said propellers includes an outer periphery and gear teeth integrally formed about said periphery;

a first set of pinions rotatably mounted on a first shaft for engaging said first propellers; and a second set of pinions rotatably mounted on a second shaft for engaging said second propellers;

wherein driving one of said input gears rotates said first propellers via said first shaft and drives the other input gear which rotates said second propellers via said second shaft.

* * * * *